US006333763B1

(12) United States Patent
Tanaka

(10) Patent No.: US 6,333,763 B1

(45) Date of Patent: Dec. 25, 2001

(54) AUDIO CODING METHOD AND APPARATUS WITH VARIABLE AUDIO DATA SAMPLING RATE

(75) Inventor: Nobuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,028

(22) Filed: Jan. 12, 1999

(30) Foreign Application Priority Data

Jan. 13, 1998 (JP) .......................... 10-004726

(51) Int. Cl.[7] .......................... H04N 7/08

(52) U.S. Cl. .......................... 348/484; 348/738

(58) Field of Search .......................... 348/423, 17, 15, 348/385, 387, 388, 482, 484, 480, 738; 704/270, 500

(56) References Cited

U.S. PATENT DOCUMENTS 5,231,492 * 7/1993 Dangi et al. .......... 348/143
5,461,619 * 10/1995 Citta et al. .......... 370/83
5,500,672 * 3/1996 Fujii .......... 348/17
5,512,939 * 4/1996 Zhou .......... 348/17
5,548,346 * 8/1996 Mimura et al. .......... 348/738
5,553,220 * 9/1996 Keene .......... 395/154
5,617,145 * 4/1997 Huang et al. .......... 348/423
6,067,126 * 5/2000 Alexander .......... 348/738

FOREIGN PATENT DOCUMENTS 56-36700 4/1981 (JP) .
59-3760 1/1984 (JP) .
64-10717 1/1989 (JP) .
4-38767 2/1992 (JP) .
7-38437 2/1995 (JP) .
7-154441 6/1995 (JP) .
7-303240 11/1995 (JP) .
8-172645 7/1996 (JP) .
8-205092 8/1996 (JP) .

OTHER PUBLICATIONS

Japanese Office Action issued Oct. 25, 2000 in a related application with English translation of relevant portions.

* cited by examiner

*Primary Examiner*—Victor R. Kostak
(74) *Attorney, Agent, or Firm*—Ostrolenk, Faber, Gerb & Soffen, LLP

(57) ABSTRACT

An audio data input together with a motion picture data is digitized by an A/D converter portion 11 and the digital data from the A/D converter portion 11 is sampled by a sampling portion 12. The sampled data is compressed by a compressing/coding portion 13. In this construction, a sampling frequency of the sampling portion 12 is variably set by a sampling frequency control portion 14 correspondingly to a scene represented by the motion picture data Thus, in coding and compressing the motion picture data and the audio data, the audio data can be effectively compressed at a variable compression rate.

10 Claims, 2 Drawing Sheets

AUDIO CODING METHOD AND APPARATUS WITH VARIABLE AUDIO DATA SAMPLING RATE

CROSS REFERENCE TO RELATED APPLICATIONS

The present invention claims priority from Japanese Patent Application No. 10 004726 filed Jan. 13, 1998, the contents of which are incorporated herein by reference.

BACKGROUND OF THE INVENTION

1. Field of the Invention

The present invention relates to a compression technique for compressing and coding an audio data input together with a motion picture data. Particularly, the present invention can be utilized in compressing data in a personal computer.

2. Description of Related Art

In handling a picture data and an audio data in a personal computer, a data compression/expansion technique has been used in order to reduce an amount of data. An algorithm called MPEG compression is generally well known among conventional data compression/expansion techniques. The MPEG compression is a technique for handling a large amount of data as a smaller amount of data, so that it is possible to reduce the amount of data by increasing the compression rate if a degradation of picture quality is allowable or it is possible to reduce the compression rate when a high picture quality is required. Currently, MPEG2 compression technique obtained by improving the basic MPEG compression technique is being used. With the MPEG2 compression technique, picture data is compressed at a frame rate of 6 Mbps and audio data is compressed at a sampling rate of 44.1 kHz, as the main compression level. These numerical values are based on picture quality similar to that obtained in the current television receiver and tone quality similar to that obtained by a compact disk.

In general, a picture quality depends upon a changing rate of scene and a value of bit rate. When the changing rate of scene change is low, the picture quality is not degraded substantially even if the bit rate is reduced, that is, the number of frames per unit time is reduced. However, when the changing rate of scene is high, the picture quality is degraded considerably. In other words, when the changing rate of scene is low, a large amount of data is not required so that there is no picture quality problem occurs even if the bit rate is reduced, while, when the changing rate of scene is high, the picture quality is degraded unless the amount of data is increased, resulting in a picture which is hardly watched comfortably. In view of this fact, an algorithm using a variable bit rate processing has been developed, in which a picture whose frequency of scene change is high is compressed at high bit rate, while a picture whose changing rate of scene is low is compressed at a lower bit rate.

As mentioned, the bit rate for a picture is changed correspondingly to the necessity of further reducing the amount of data and the processing thereof.

On the other hand, the amount of audio data is small compared with that of a picture so that it is usual to code the audio data at a constant sampling frequency. However, in a general purpose equipment such as a personal computer which performs almost all processing according to a software, it is desired to compress even audio data whose amount is small to some extent since a load on a central processing unit (CPU) is large.

Japanese Patent Application Laid-open No. Hei 7-303240 discloses a technique in which, in processing an audio data accompanied with a motion picture data, an audio signal is reproduced by changing a speed of the audio signal itself in reproducing a video signal at a variable speed. In order to change the audio signal speed, the Time Domain Harmonic Scaling (TDHS) technique is used, with which it is possible to reproduce the audio signal at a variable speed without changing the interval thereof. However, this technique is used to not compress an amount of audio data but reproduce a recorded audio data while changing its speed.

Japanese Patent Publication No. Sho 59-3760 discloses a technique, in which a sampling frequency for coding and a reproducing speed in decoding are selected correspondingly to a required service. In this technique, a clock rate is arbitrarily changed under control of a transfer control device correspondingly to the service to make the coding bit rate during a storage time and the decoding bit rate during a reproduction corresponding thereto variable independently. However, this technique is used to neither flexibly change the sampling frequency in one service (a series of audio data) nor make the compression rate of the audio data accompanied with a motion picture data variable.

Other well known techniques related to the compression of the audio signal as well as the picture signal and the sampling processing in compressing them are disclosed in Japanese Patent Application Nos. Sho 56-36700, Sho 64-10717, Hei 4-38767, Hei 7-154441, Hei 8-172645 and Hei 8-205092. However, these prior arts do not make the compression rate of the audio data accompanied with the motion picture data variable.

SUMMARY OF THE INVENTION

An object of the present invention is to provide a coding method and apparatus capable of effectively compressing an audio data at a variable compression rate, in coding and compressing a motion picture data and the audio data.

That is, according to the present invention, the audio data coding method for coding the audio data input together with the motion picture data is featured by variably setting a sampling frequency of the audio data according to a scene represented by the motion picture data.

The coding apparatus according to the present invention realizes the above mentioned coding method and is featured by comprising sampling means for sampling an audio data input together with a motion picture data, coding means for coding data obtained by the sampling means and a sampling frequency control means for variably setting a sampling frequency of the sampling means correspondingly to a scene represented by the motion picture data.

BRIEF DESCRIPTION OF THE DRAWINGS

The above mentioned and other objects, features and advantages of the present invention will become more apparent by reference to the following description of the invention taken in conjunction with the accompanying drawings, in which.

DETAILED DESCRIPTION OF THE PREFERRED EMBODIMENTS

Figure 1:
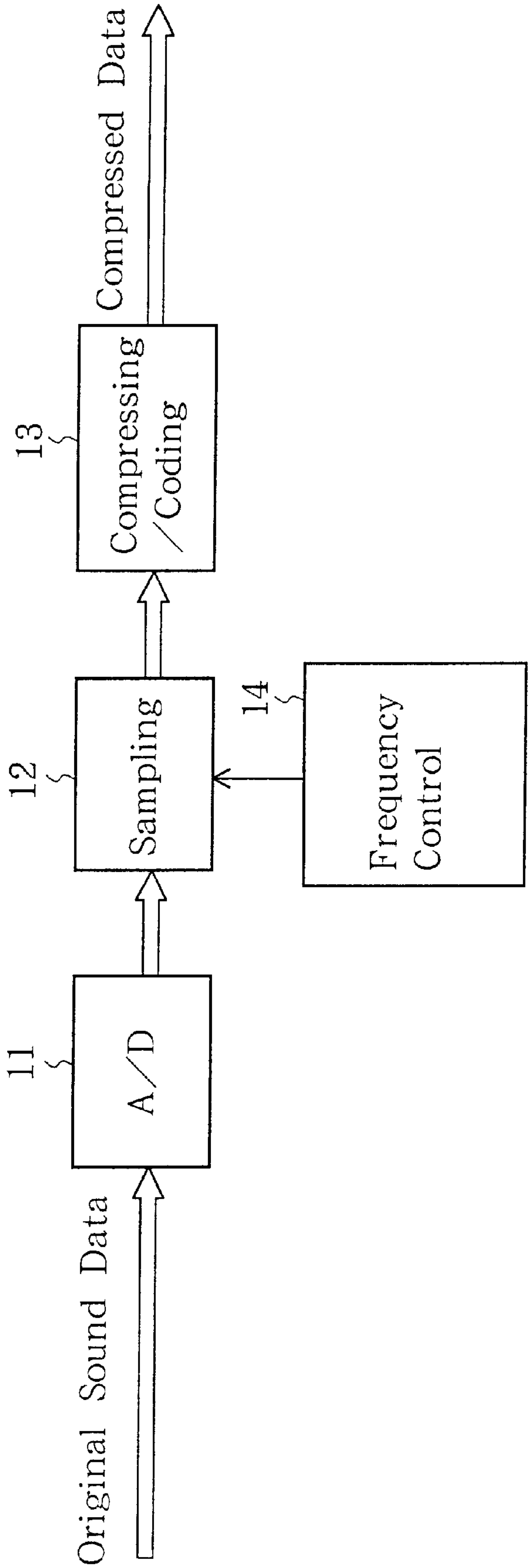
FIG. 1 is a block circuit diagram of a coding device according to an embodiment of the present invention.

FIG. 1 is a block diagram showing a construction of a coding device according to an embodiment of the present invention. The coding device shown in FIG. 1 comprises an A/D converter 11 and a sampling portion 12 which constitute an audio data coding unit provided in the coding device for coding a motion picture data and an audio data (referred to as "original audio data", hereinafter) input together with the motion picture data, a compressing/coding portion 13 for coding data output from the sampling portion 12 and a sampling frequency control portion 14 for variably setting the sampling frequency of the sampling portion 12 correspondingly to a scene represented by the motion picture data. In this embodiment, it is assumed that the sampling portion 12 and the compressing/coding portion 13 are realized by a general purpose processor or a signal processor. Therefore, the original audio data which is an analog data is digitized by the A/D converter 11 and, then, a resultant digital data is sampled.

Describing the audio data coding method according to the present invention briefly, a compression of a digital data by means of MPEG, etc., in a digital data processing system of such as a personal computer can be performed without waste by sampling the digital data adaptively at an optimal sampling frequency at which a required tone quality suitable for a scene is obtainable. Further, since a compressed data to be produced is sampled at an optimal sampling frequency, a high frequency sampling is performed for a scene in which a high quality data is required and a low frequency sampling is performed for a scene in which high quality is not required. Therefore, the amount of compressed coding data is reduced and the amount of processing is also reduced compared with a case where the data is sampled at a constant high sampling frequency.

Figure 2:
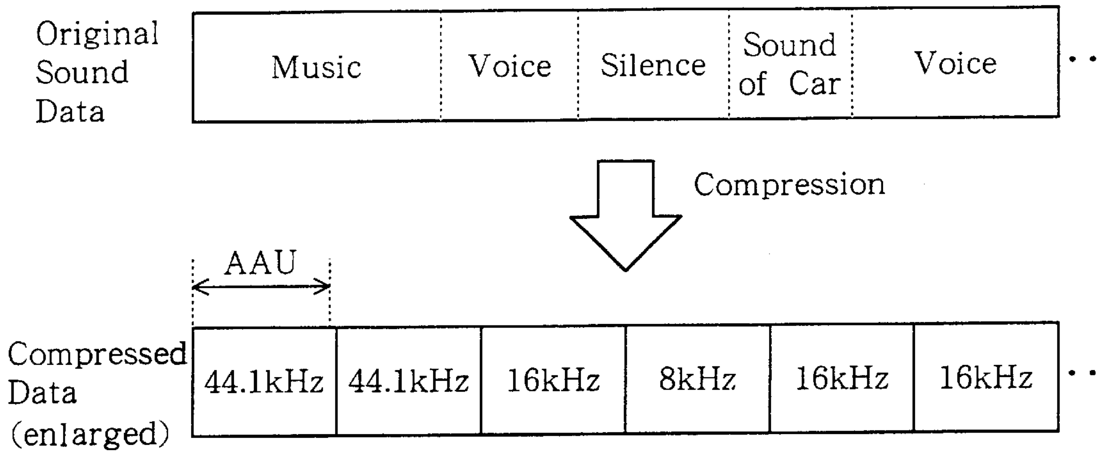
FIG. 2 is a correspondence of sampling frequency assignment of an original audio data and a compression data for explaining a variable sampling rate coding method of the present invention.

FIG. 2 shows an example of a sampling frequency assignment of the original audio data and the compressed data. It should be noted that the compressed data is shown in an enlarged scale. In the same figure, AAU indicates an Audio Access Unit.

When a user compresses the original audio data, a sampling frequency for the original audio data is set by the sampling frequency control portion 14 for every scene of the motion picture. The sampling portion 12 samples the digitized original audio data by using the thus set sampling frequency. The sampled data is coded by the compressing/coding portion 13. Since the compressed data is usually produced by the compressing/coding portion 13 in a specific unit which is not always synchronized with a switching of scene of the motion picture data corresponding to the original audio data, the switching of the original audio data is not always coincides with a switching of the compressed data.

It is assumed here that an audio data of a movie, etc., is compressed and coded and that a motion picture data corresponding to the original audio data is constructed with a music scene, a human voice scene, a silent scene and a scene in which a car is running (car sound), etc. In such case, since the silent scene and the scene in which a car is merely passing through does not require so high tone quality, a low sampling frequency is set in such scenes. On the other hand, a high sampling frequency is assigned to scenes such as music and human voice which requires a high tone quality.

That is, a sampling frequency of 44.1 kHz compatible with a compact disk (CD) is assigned to the music scene which requires a high tone quality, a sampling frequency of 16 kHz or 32 kHz is assigned to the scene containing voices which requires a middle tone quality and a low sampling frequency of 8 kHz is assigned to the silent or car scene, etc., which does not require high tone quality. As mentioned above, since the compression data unit does not always synchronized with the switching of scene, a high sampling frequency is set for a scene which covers the unit by stretching the scene to some extent.

In order to expand (reproduce) a compressed data, an information related to the sampling frequency is described by adding an AAU to the compressed data as a header by the compressing/coding portion 13. It is possible to expand and reproduce the compressed data at a sampling frequency corresponding to the compressed data on a receiving side of the compressed data on the basis of the information described in the header portion.

Figure 3A:
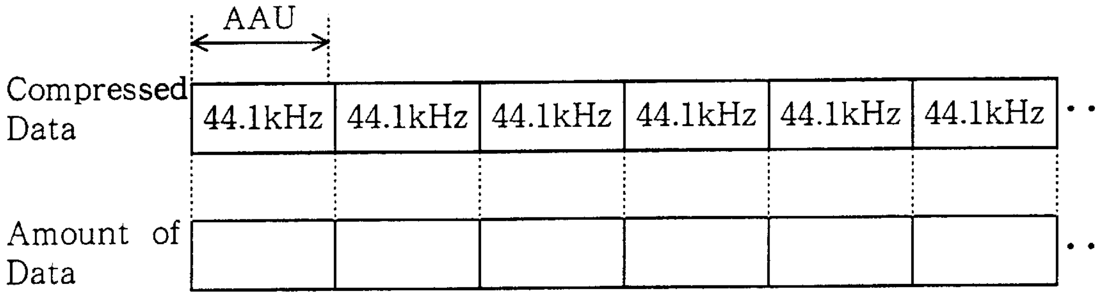
Prior Art FIG.3a
FIG. 3A shows a relation between the original audio data and the amount of sampled data when the data is sampled at a constant sampling frequency of 44.1 kHz.
Figure 3B:
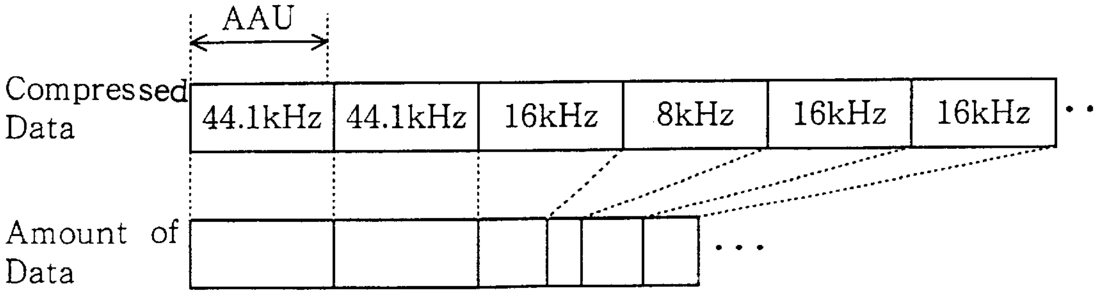
FIG. 3B shows a relation between the original audio data and the amount of sampled data when the data is sampled at a variable sampling frequency.

FIGS. 3A and 3B shows a relation between the original sound data and the data amount after the sampling, in which FIG. 3A shows a case where the compressed data is sampled at a constant sampling frequency of 44.1 kHz and FIG. 3B shows a case where the compressed data is sampled at a variable sampling frequency. Referring to FIG. 3A, since the sampling frequency is 44.1 kHz constantly in the conventional method, the amount of data for each of the respective data portions is the same as that of the AAU. On the contrary, in the case shown in FIG. 3B, a variable sampling frequency with maximum being 44.1 kHz and minimum being 8 kHz is assigned to each of the respective scenes. Therefore, the amount of data of a scene to which a low sampling frequency is assigned is small.

As mentioned, it is possible to reduce the amount of data to be compressed and coded by the compressing/coding portion 14 to thereby reduce the amount of processing thereof, by compressing and coding the original audio data by variably setting sampling frequencies optimal to the respective scenes. On the other hand, the quality of the compressed data is low for a scene to which a low sampling frequency is set. However, in the silent scene or the running car scene, some degradation of tone quality may be negligible and is advantageous in data processing. If the audio data is sampled at high sampling frequency in the silent scene, the data processing therefor is useless.

As described, according to the present invention in which the sampling frequency of the audio data is changed correspondingly to the scene of motion picture such that a high quality compressed data is produced for a scene which requires a high quality and a low quality compressed data is produced for scenes including a silent scene which do not require a high quality, it is possible to produce a compressed data of optimal quality to scenes without waste of sampling processing to thereby reduce the amount of compressing/coding data and the processing amount thereof, compared with the conventional case in which the sampling is performed at a constant sampling frequency.

What is claimed is:

1. A method of coding audio data associated with motion picture data by compressing the audio data, the method comprising:

sampling the audio data at an adjustable sampling frequency;

performing a compression process on the sampled audio data; and adjusting the sampling frequency for the audio data according to variations of the motion picture data.

2. A coding method as described in claim 1, in which the sampling frequency is adjusted to provide optimal tonal quality for the audio data in accordance with the content of the motion picture data.

3. A coding method as described in claim 1, in which a first sampling frequency is selected for a motion picture scene requiring high tonal quality, and a sampling frequency lower than the first sampling frequency is selected for a motion picture scene not requiring high tonal quality.

4. A coding method as described in claim 1, further including adding sampling rate identification data to the compressed audio data.

5. A coding method as described in claim 1, in which the maximum sampling frequency is 44.1 kHz, and the minimum sampling frequency is 8 kHz.

6. A coding device for audio data associated with motion picture data comprising:

a variable frequency sampling unit which samples an audio data input;

a coding unit which compresses the sampled audio data; and a control unit which sets the sampling frequency of the sampling unit according to a scene represented by the motion picture data.

7. A coding device as described in claim 6, in which the sampling frequency is adjusted to provide optimal tonal quality for the audio data in accordance with the content of the motion picture data.

8. A coding device as described in claim 6, in which a first sampling frequency is selected for a motion picture scene requiring high tonal quality, and a sampling frequency lower than the first sampling frequency is selected for a motion picture scene not requiring high tonal quality.

9. A coding device as described in claim 6, further including adding sampling rate identification data to the compressed audio data.

10. A coding device as described in claim 9, in which the maximum sampling frequency is 44.1 kHz, and the minimum sampling frequency is 8 kHz.

* * * * *